(12) United States Patent
Arbuckle et al.

(10) Patent No.: US 11,197,034 B2
(45) Date of Patent: Dec. 7, 2021

(54) RECORDED CONTENT STORAGE AND DELIVERY MANAGEMENT

(71) Applicant: Comcast Cable Communications, LLC, Philadelphia, PA (US)

(72) Inventors: David Arbuckle, Denver, CO (US); Jason Burgess, Highlands Ranch, CO (US); Neill Kipp, Centennial, CO (US); Richard Fliam, Greenwood Village, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 17/004,359

(22) Filed: Aug. 27, 2020

(65) Prior Publication Data
US 2021/0227269 A1    Jul. 22, 2021

Related U.S. Application Data

(63) Continuation of application No. 14/730,519, filed on Jun. 4, 2015, now Pat. No. 10,791,346.

(51) Int. Cl.
*H04N 21/231* (2011.01)
*H04N 21/845* (2011.01)
(Continued)

(52) U.S. Cl.
CPC ... *H04N 21/23116* (2013.01); *H04N 21/2181* (2013.01); *H04N 21/2393* (2013.01);
(Continued)

(58) Field of Classification Search
CPC ......... H04N 21/23116; H04N 21/2181; H04N 21/23113; H04N 21/2393; H04N 21/2405; H04N 21/482; H04N 21/4334; H04N 21/47214; H04N 21/47202; H04N 21/42201; H04N 21/25; H04N 21/251; H04N 21/258; H04N 21/25891; H04N 21/45; H04N 21/4532; H04N 21/466;
(Continued)

(56) References Cited

U.S. PATENT DOCUMENTS 5,862,342 A * 1/1999 Winter ............. G08B 13/19604
                                                          709/231
8,548,297 B2    10/2013 Pashkevich et al.
(Continued)

OTHER PUBLICATIONS

US Patent Application filed on Jan. 28, 2020, entitled "Fault Tolerant Capacity Exchange", U.S. Appl. No. 16/775,028.

*Primary Examiner* — Alexander Gee
(74) *Attorney, Agent, or Firm* — BakerHostetler

(57) ABSTRACT

Systems and methods for managing the storage and delivery of recorded content in a network digital video recorder (DVR) system are disclosed. A plurality of requests to record a program may be received, wherein the program may comprise a plurality of segments. A segment from the plurality of segments may be determined to be copied to a first storage. A copy of the segment may be received from a second storage and a plurality of copies of the segment may be created in the first storage from the copy of the segment received from the second storage. The quantity of the plurality of copies of the segment may be equal to the quantity of the plurality of requests to record the program.

20 Claims, 6 Drawing Sheets

(51) Int. Cl.
*H04N 21/2747* (2011.01)
*H04N 21/239* (2011.01)
*H04N 21/218* (2011.01)
*H04N 21/24* (2011.01)

(52) U.S. Cl.
CPC ... *H04N 21/23113* (2013.01); *H04N 21/2747* (2013.01); *H04N 21/8456* (2013.01); *H04N 21/2405* (2013.01)

(58) Field of Classification Search
CPC ....... H04N 21/44218; H04N 21/25883; H04N 21/475; H04N 21/4751; H04N 21/4753; H04N 21/4147; H04N 21/25816; H04N 21/25875; H04N 21/4325; H04N 21/4405; H04N 21/64322; H04N 5/50; H04N 2005/44547; H04N 2005/4444; H04N 2005/44569; H04N 7/1662; H04N 7/163; H04N 7/17354
See application file for complete search history.

(56) References Cited

U.S. PATENT DOCUMENTS

| | | | |
|---|---|---|---|
| 10,587,902 | B2 | 3/2020 | Kipp et al. |
| 2003/0118322 | A1 | 6/2003 | Kim |
| 2003/0133453 | A1* | 7/2003 | Makishima ......... H04L 12/4625 370/395.1 |
| 2004/0156614 | A1 | 8/2004 | Bumgardner et al. |
| 2005/0193023 | A1 | 9/2005 | Ismail |
| 2008/0086750 | A1* | 4/2008 | Yasrebi ................. H04N 21/84 725/86 |
| 2008/0282312 | A1 | 11/2008 | Blinnikka |
| 2011/0126258 | A1 | 5/2011 | Emerson et al. |
| 2011/0231569 | A1* | 9/2011 | Luby .................. H04N 21/2401 709/234 |
| 2013/0080565 | A1 | 3/2013 | Van et al. |
| 2014/0153904 | A1* | 6/2014 | Matyam ................ H04N 5/782 386/248 |
| 2015/0350701 | A1* | 12/2015 | Lemus ............... H04N 21/2393 725/92 |

* cited by examiner

RECORDED CONTENT STORAGE AND DELIVERY MANAGEMENT

CROSS REFERENCE TO RELATED APPLICATIONS

This application is a continuation application of U.S. patent application Ser. No. 14/730,519, filed Jun. 4, 2015, which is hereby incorporated by reference in its entirety.

BACKGROUND

Digital cable television has largely replaced the traditional analog cable television systems of the decades past. The prevalence of digital cable television has facilitated the introduction of digital video recorders (DVRs). A standard DVR may be a set-top box and contain a hard drive on which to store recorded digital programming. An evolution of the standard DVR is a cloud or network DVR service which may be offered, for example, by a cable service provider. With a cloud or network DVR service, an at-home user may request that a particular television program be recorded. Instead of, or in addition to, the program being recorded on a device in the user's home, as with a standard DVR configuration, the cloud or network DVR service records and stores a copy of the requested program on the cable provider's servers for the requesting user. When the user wishes to view the program, the cloud or network DVR service then delivers the copy of the recorded program to the user's cable box, mobile device, web browser, or the like for playback. Since a copy of a recorded program is created for each requesting user, there are significant data management (e.g., writing, accessing, storing, and/or delivering recorded programs) challenges inherent in a cloud or network DVR system. For instance, a conventional cloud or network DVR system may expend a large amount of storage resources in performing discrete write operations for each copy of a recorded program when multiple users request to record the same program. These and other shortcomings of the prior art are addressed by the present disclosure.

SUMMARY

This disclosure relates to systems and method for managing the storage and delivery of recorded content. In an aspect, a system or method may include a network digital video recorder system receiving a plurality of requests, such as from subscribers, to record a program, such as a television program. The network digital video recorder system may include a plurality of recording agents and the program may include a plurality of segments stored on a storage medium. A segment from the plurality of segments may be selected to copy to a recording storage. One of the recording agents may be selected to perform the copy operation to the recording storage. The recording agent may perform a single access of the segment from the storage medium and create a copy of the segment in the recording storage for each request received by the network digital video recorder to record the program.

In an aspect, a system or method may include receiving a plurality of requests to record a program, such as a television program. The program may include a plurality of segments. A segment from the plurality of segments may be selected to be copied to a first storage, such as, for example, a recording storage. A copy of the segment may be received from a second storage, such as, for example, a linear storage. The copy of the segment received from the second storage may be used to create a copy of the segment in the first storage for each request to record the program.

In an aspect, a system or method may include receiving a request, such as from a user's device, to deliver a program, such as a television program. The program may include a plurality of segments in a sequential ordering. A first copy of the program may be stored in a first storage, such as an archive storage. The request may indicate a temporal location in the program. The method may further include selecting a first segment of the plurality of segments that is associated with the temporal location. A copy of the first segment may be created in a second storage, such as a recording storage. The copy of the first segment in the second storage may be delivered to the user's device, where the segment may be played. A second segment of the plurality of segments that is prior to the first segment in the sequential ordering may be selected. A copy of the second segment from the first storage may be created in the second storage.

BRIEF DESCRIPTION OF DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

This disclosure provides systems and methods for managing the storage and delivery of recorded content in a system, such as a cloud or network digital video recorder (DVR) system. In particular, the disclosed systems and methods may leverage the segmented nature of a program to facilitate the storage and delivery of the program. For example, a system may receive requests from multiple users to record a particular television show. A unique copy of the television show may be created and stored for each of the requesting users. A recording management system may create the multitude of unique copies of the program on a per-segment basis. After selecting a segment of the program, the recording management system may select a recording agent to exclusively perform the task of creating a copy of the segment in a recording storage for each of the requesting users. The recording agent may perform a single access of the segment and direct the recording storage to create the multiple copies of the segment in a single write operation. In some embodiments, the copies of the segment may be written to a hard disk of the recording storage in sequence. The process may be repeated for each segment of the program until there exists a complete unique copy of the program in the recording storage for each requesting user. When a user wishes to view the recorded program, the user's unique copy in the recording storage may then be delivered to that user's device for viewing.

After a period of time, the unique copies of a program in the recording storage may be removed from the recording storage and consolidated in a single copy in an archive storage. If a user wishes to view the program, a unique copy of the program may be recreated in the recording storage and that unique copy may be delivered to the user for playback. As an example, a user may request to view the program at a mid-point in the program or may skip portions of the program. In this case, it is not necessary to deliver the initial or skipped portions of the program to the user's device. However, the entirety of the program is still to be reconstituted in the unique copy in the recording storage. This disclosure provides systems and methods to facilitate the delivery of the program and creation of the unique copy of the program in the recording storage. For example, the recording management system may indicate a segment of the program corresponding to the playback point specified by the user, copy that segment to the recording storage, and deliver that segment to the user's device for playback. This may be repeated while the user continues viewing the program or until the program completes. After this, the remaining segments may be copied from the archive storage to the recording storage, thus completing the unique copy.

Figure 1:
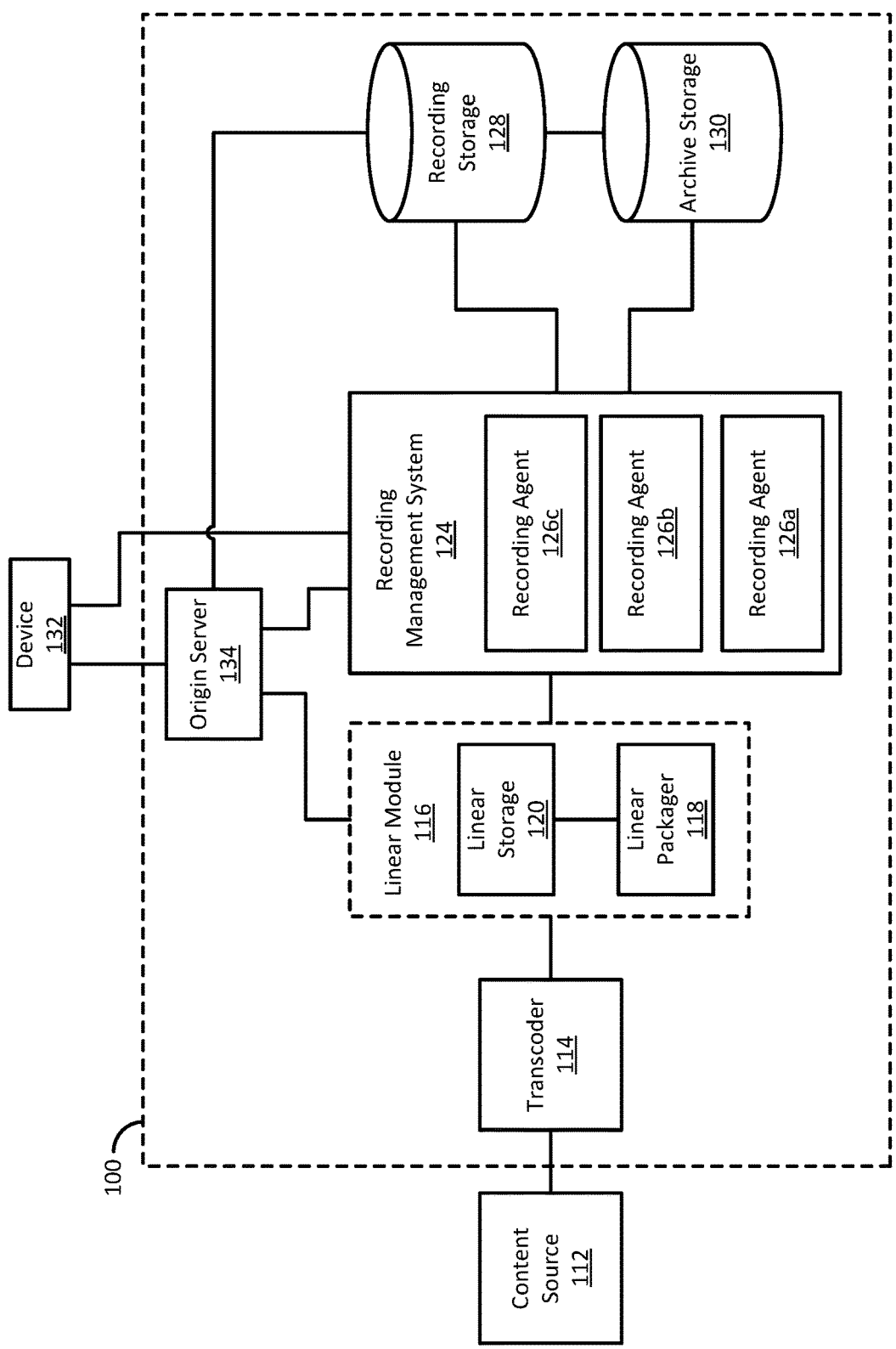
FIG. 1 illustrates a block diagram of an exemplary system in accordance with aspects of the disclosure.

FIG. 1 illustrates an exemplary system 100, such as a cloud or network DVR system, by which a service provider, such as a cable television service provider, may receive a request to record a program, store the requested program, and potentially fulfill a request to deliver the requested program for playback. A program may comprise any sequential recording such as, for example, a television show, a movie, a sports event broadcast, or the like. As used herein, a program may additionally include a portion of a program. The request to record a program may be received from a device 132 and the requested program may be delivered to the device 132 for playback. As used herein, the device 132 may refer to a hardware element, such as a set-top cable box, a streaming-video player, or a quadrature amplitude modulation (QAM) client, or a software element, such as a web browser or other software adapted to playback video. It will be appreciated that the device 132 used to request that the program be recorded in the system 100 may be distinct from the device 132 used to receive the recorded program for playback. To illustrate, a user may use his or her set-top cable box to request that a particular program be recorded in the system 100, but may later request and playback the program with software running on his or her smart phone. The device 132 may be connected to the system 100 via any suitable network, which may comprise, for example, a cable network, satellite network, and/or the Internet.

The system 100 may include an origin server 134. The origin server 134 may receive and fulfill a request from the device 132 of a user to deliver a recorded program to the device 132 for playback. The request from the device 132 to deliver the recorded program may include identifications of the user (e.g., an account identifier, a username and/or a password), the device 132, the requested program, and/or a playback time point or temporal location (e.g., the start of a program or the 12:30 mark in a 30:00 program). In certain aspects, the request to deliver the program may reflect a user skipping to a particular portion of a program of which the initial segments of the program have already been delivered and are being played on the device 132. For example, a user may have started viewing the first minute of a program and then decided to skip to a midway point of the program. In this case, the request to deliver the program would indicate that the device 132 required the segments of the program from that midway point and after. Upon receiving a request to deliver a recorded program to the device 132, the origin server 134 may provide one or more manifest files (discussed further herein) to the device 132 that describe the program and segments thereof, including network locations from which each segment may be downloaded. Using the manifest file, the device 132 may iteratively download the segments comprising the program. As the device 132 downloads sufficient segments of the program, the device 132 may begin playback of the program.

The system 100 may include a transcoder 114. The transcoder 114 may receive a program from a content source 112. The program may be in any one of a variety of formats, such as, for example, H.264, MPEG-4 Part 2, or MPEG-2. The transcoder 114 may convert the program from one video format to another video format, such as one amenable to the means by which the service provider's users view the programs. The transcoder 114 may additionally segment the program into a plurality of segments. For example, a program may be segmented into a series of 2-second segments.

The transcoder 114 may be communicatively connected to a linear module 116, which in turn may include a linear packager 118 and a linear storage 120. The linear packager 118 and the linear storage 120 may be communicatively connected. It will be appreciated that the linear module 116 may refer generally to one or more interconnected servers, storage devices, logical elements, and the like.

The linear packager 118 may receive the program from the transcoder 114 or the recording management system 124 (discussed further herein). The linear packager 118 may determine how the program is to be segmented and put together for delivery to and eventual playback by the device 132. As part of this process, the linear packager 118 may segment the program (such as in the event that the program has not yet been segmented) or may re-segment the program (such as in the event that the program had been previously segmented). The linear packager 118 may additionally insert one or more cues or markers into the program segments at which one or more additional segments, such as segments comprising an advertisement, may be inserted by an upstream client, server, or logical module, such as the device 132 or the origin server 134.

The linear packager 118 may create a manifest file associated with the program. Generally, a manifest file may contain information describing various aspects of the associated program that may be useful for the device 132 to playback the program and/or for the recording management system 124 to store and retrieve the program. For example, a manifest file may indicate the segments comprising the program, the length of each segment, the number of segments, and/or the proper ordering of the segments necessary to effectuate a playback of the program. A manifest file may further include a network location (e.g., a hyper-text transfer protocol (HTTP) uniform resource locater (URL) link or other universal resource identifier (URI)) for each segment from which the segment may be downloaded, accessed, or retrieved. For example, the network location may indicate a location on the linear storage 120 or recording storage 128.

It will be appreciated that the network locations included within a manifest file may point to more than one different location or source. For example, the network location for segments corresponding to the program may reference a location on the linear storage 120 while the network location for segments corresponding to an inserted advertisement may reference a location from outside the system 100. In some instances, a manifest file may describe multiple versions (e.g., different quality levels) of the program, including corresponding information on those segments. A manifest file may be provided, such as by the origin server 134, to the device 132 in response to a request to receive a program recorded within the system 100. The device 132 may use the manifest file to determine the segments required to play the program or a portion of the program and subsequently download the required segments using the network locations specified in the manifest file.

The program or portions thereof may be stored in the linear storage 120, which may be accessed by the device 132 directly or indirectly via the origin server 134 to deliver the program to the device 132. The storage of the program or portions thereof may occur, in an aspect, after the linear packager 118 processes the program. The linear storage 120 may include one or more data storage devices, such as volatile memory (e.g., random access memory (RAM)), a hard disk drive, a network-attached storage (NAS), and/or a storage area network (SAN) upon which the program or portions thereof may be stored.

A recording management system 124 may be communicatively connected to the linear module 116. The recording management system 124 may serve to coordinate the creation and retrieval of unique duplicate program recordings. In particular, the recording management system 124 may coordinate the simultaneous creation of multiple duplicate program recordings of one or more programs (e.g., when 100 users have each requested the recording of a particular program). The recording management system 124 may receive one or more requests from devices 132 to record a program. The request to record a program may include, for example, identifications of the user (e.g., an account identifier, a username, and/or a password), the device 132, the program, the station, the stream, the start time of the program, and/or the end time of the program. Upon receiving a request to record a program, the recording management system 124 may access a copy of the segmented program from the linear module 116 (e.g., the linear packager 118 and/or the linear storage 120) and prepare to store a recording of the program in a communicatively connected recording storage 128. The recording storage 128 may include one or more storage devices, such as a hard disk drive, a network-attached storage (NAS), and/or a storage area network (SAN).

The recording management system 124 may include a plurality of recording agents 126*a-c*, which may each represent a pool of resources available to independently perform a recording task, such as writing copies of a segment to the recording storage 128. The recording management system 124 may track and maintain the status of each of the recording agents 126*a-c*. For example, the recording management system 124 may, at any given time, know which recording agents 126*a-c* are busy performing a recording task and which are available to be assigned a recording task to perform. As each of the recording agents 126*a-c* completes a recording task, the recording agent 126*a-c* may indicate to the recording management system 124 that the recording agent 126*a-c* is now available. In another aspect, each of the recording agents 126*a-c* may maintain each recording agents' 126*a-c* respective state (e.g., busy, available, etc.) instead of the recording management system 124 maintaining the state of each of the recording agents 126*a-c*. In such an aspect, a queue of available recording agents 126*a-c* may be maintained, such as by the recording management system 124. When one of the recording agents 126*a-c*, such as recording agent 126*a*, becomes available, the recording agent 126*a* may insert itself into the queue. When the recording management system 124 has a task to be performed, the recording management system 124 may query the queue for the next available recording agent 126*a-c* and assign the task to that recording agent 126*a-c*.

In an aspect, the recording management system 124 may access, such as from the linear storage 120, a segment of a program that has been requested to be recorded. Based on this single access of the segment, the recording management system 124 may direct one of the available recording agents 126*a-c*, such as recording agent 126*a*, to write a copy of this segment to the recording storage 128 for each request for the program to be recorded. As an example, the recording agent 126*a* may provide an instruction, such as over a network socket, to the recording storage 128, wherein the instruction specifies the file of the segment and the number of times that the file is to be copied to the recording storage 128. The instruction may include an HTTP command, such as PUT, POST, or PATCH. In this manner, the segment is written multiple times to storage, but is accessed (i.e., read) only a single time. Thus, this may result in a performance increase of the recording management system 124 and the system 100 as a whole because the read operation of the segment from the linear storage 120 need only occur a single time for all the segment copies instead of once for each segment copy. When the recording agent 126*a* finishes writing the copies of the segment to the recording storage 128, the recording agent 126*a* may indicate to the recording management system 124 that the recording agent 126*a* has successfully written the copies of the segment and that the recording agent 126*a* is available to perform another recording task. In the event that the recording agent 126*a* is unsuccessful in its task (e.g., the recording storage 128 indicates a disk error), the recording agent 126*a* may indicate so to the recording management system 124 and the recording management system 124 may direct the recording agent 126*a* to attempt to repeat the recording task or assign the recording task to another of the recording agents 126*a-c*, such as recording agent 126*b*. This process may be repeated until all of the segments of the program are copied to the recording storage 128 and there is a complete copy of the program in the recording storage 128 for each user request to record the program.

In an aspect, the recording management system 124 may direct one of the recording agents 126*a-c*, such as recording agent 126*a*, to write multiple copies of a segment to disk, as described above. Since the recording management system 124 and the recording agent 126*a* know that the recording agent 126*a* is to write the same segment multiple times to the recording storage 128, this fact may be leveraged to more efficiently perform the write operation. In this aspect, the recording management system 124 may direct the recording agent 126*a* to write the multiple copies of the segment in physical sequence on a hard disk of the recording storage 128. By writing the multiple copies of the segment in sequence, a head of the hard disk is required to seek a write location on a hard disk platter only once. In contrast, a non-sequential write operation to a hard disk would involve multiple seek operations and, thus, take longer to perform the write operation. In order to facilitate a sequential write operation of multiple copies of a segment, the recording management system 124, the recording agent 126*a*, and/or the recording storage 128 may determine a total amount of storage required. This may include multiplying the number of copies of the segment that are to be written (i.e., the number of pending user requests to record the program containing the segment) by the size of the segment. With the total amount of storage determined, the recording management system 124, the recording agent 126*a*, and/or the recording storage 128 may access information on the status of the hard disks of the recording storage 128, such as which hard disk blocks or partitions are available for writing. With this information and the total amount of storage required, a location on the disk may be determined to perform the sequential write of the multiple copies of the segment.

In an aspect, a batching strategy may be determined, such as by the recording management system 124, in which the multiple copies of a segment that are to be written to storage, such as the recording storage 128, may be split into a plurality of sets or batches. The splitting of the multiple copies of the segment into a plurality of batches may be based on a capacity or available capacity of a hard disk (or platter thereof) of the recording storage 128 or a period of time in which the write operation must complete. For example, if 100,000 copies of a 10 megabyte (MB) segment are to be written to the recording storage 128 and each of the hard disks of the recording storage 128 have a capacity of 100 gigabytes (GB), the 100,000 copies to be written may be split into ten batches of 10,000 copies each. Each of the ten batches may be executed, such as by the recording management system 124, to write the respective 10,000 copies of the segment to a separate respective hard disk in sequence, as described herein. In an aspect, each of the ten batches may be assigned by the recording management system 124 to one of the recording agents 126*a-c* to be executed.

An archive storage 130 may be communicatively connected to the recording management system 124 and/or the recording storage 128, and may include one or more storage devices, such as a hard disk drive, a network-attached storage (NAS), and/or a storage area network (SAN). The archive storage 130 may archive copies of a program that have spent a certain amount of time in the recording storage 128. That is, once a certain amount of time passes since a program has been recorded and copies made in the recording storage 128, the copies in the recording storage 128 may be deleted and a single copy may be made in the archive storage 130. If the archived program is requested by a user to be delivered to the device 132 of the user for playback, the recording management system 124 may access the copy of the program in the archive storage 130 and make a new copy of the program in the recording storage 128. The copy of the program in the recording storage 128 may then be delivered to the device 132 of the user, either directly or via the origin server 134, which may be communicatively connected to the recording storage 128 directly or via the recording management system 124.

In an aspect, the segmented nature of the program may be leveraged to begin delivering the program from the recording storage 128 to the device 132 before the program is completely copied over from the archive storage 130. In this instance, when a user requests delivery of a program archived in the archive storage 130, the recording management system 124 may begin by copying the first segment of the program to the recording storage 128. The origin server 134 need not wait until all of the segments of the program are copied to the recording storage 128 before beginning to deliver the program to the device 132, but may instead begin delivering the segments of the program when the first segment (or otherwise sufficient beginning subset of the segments) is copied to the recording storage 128. The recording management system 124 may then continue copying subsequent segments (e.g., the second segment, the third segment, and so forth) of the program to the recording storage 128, which may then be delivered to the device 132. Preferably, the subsequent segments may be copied from the recording storage 128 to the archive storage 130 and delivered to the device 132 at a rate sufficient for the playback of the segments on the device 132 to be seamlessly maintained. If the playback on the device 132 is stopped or paused and no additional segments of the program are requested, a full duplicate copy may still be created. Thus in this instance, the recording management system 124 may determine the segments of the program that do not need to be delivered to the device 132 (e.g., segments preceding a mid-program playback start point, segments that are skipped during playback, such as those for a commercial, and segments subsequent to a playback stop point) and have not yet been copied to the recording storage 128. Those segments may then be copied from the archive storage 130 to the recording storage 128 to reconstitute the entire unique copy of the program.

Figure 2:
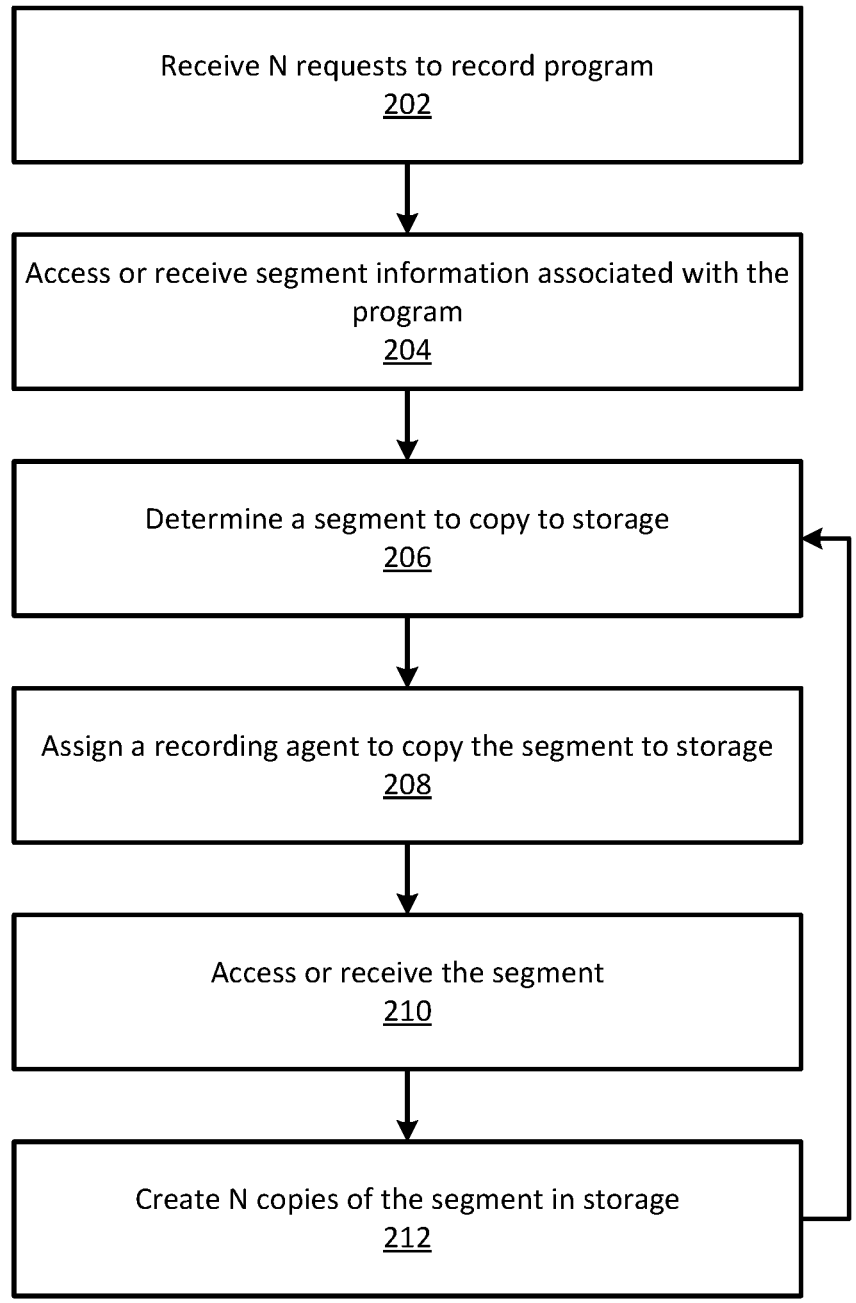
FIG. 2 illustrates a flow chart of an exemplary method in accordance with aspects of the disclosure.

FIG. 2 illustrates an example flow chart for a method 200 of recording unique copies of a program to storage based on user requests to record the program. At step 202, a number (N) of requests to record a program may be received by, for example, the recording management system 124. The request may be provided by one or more devices 132 associated with a user. As an example, a request to record the program may be a real-time request, such as when a user is watching a program and impulsively decides to record the program. As another example, a request to record the program may be a scheduled request, such as when a user has seen the then-future program on a television schedule and designates the program to be recorded when the program is shown. In the event that scheduled requests are managed by a scheduling module within the recording management system 124, the scheduling module may provide the request to record to the recording management system 124 at the time that the program is shown. The request to record a program may include, for example, identifications of the user (e.g., an account identifier, a username, and/or a password), the device 132, the program, the station, the linear stream, the start time of the program, and/or the end time of the program.

At step 204, segment information associated with the program may be accessed or received. Concurrent to the requests for recording the program being received, the program may be received by the system 100 from the content source 112, wherein the program is transcoded and segmented into segments. One or more manifest files may additionally be created that describe the segmentation of the program and a location of each segment making up the program, such as a location in the linear storage 120. As an example of accessing or receiving segment information, the recording management system 124 may access or receive, such as from the linear storage 120, the manifest file associated with the program.

At step 206, based at least on the segment information, a segment of the program may be determined, such as by the recording management system 124, that will be copied to storage, such as the recording storage 128. The recording management system 124 may use the manifest file associated with the program to extract the necessary segment information. For example, the manifest file may indicate the total number of segments making up the program or a portion of the program, the length of the program, the length of each segment, and an order or sequence of the segments. Based on the segment information and also, for example, which, if any, segments of the program have already been copied to storage, the recording management system 124 may determine a segment of the program to copy to storage. As an illustration, if the request to record a program was for a complete program (e.g., a scheduled request) and no segments of the program had yet been determined and copied to storage, the recording management system 124 may determine the first segment as the segment to copy to storage. As another illustration, if the first X segments of the program had already been copied to storage, the recording management system 124 may determine the next segment (i.e., the segment at the X+1 position in the sequence of segments) as the segment to copy to storage.

It will be appreciated that a reference to a copy, such as a copy of a segment, may refer to a second segment that comprises at least a portion of the original segment. A reference to a copy is not so limited as to require that a copy of a segment be identical in all regards to the original segment. Similarly, a reference to copying, such as copying an original segment, may refer to the act of creating a second segment that comprises at least a portion of the original segment. Moreover, a copy may be in reference to the content of a program or segment without regard to form. For example, an instance of a program in standard definition may be considered to be a copy of an instance of the same program in high definition. As another example, two segments of the same portion of a program (i.e., the same content) may be considered to be copies of each other although the first segment may be in one video format, such as H.264, and the second segment may be in a another video format, such as H.262.

At step 208, one of the recording agents 126a-c, such as the recording agent 126a, may be assigned by the recording management system 124 to copy the determined segment of the program to storage, such as the recording storage 128, N times (i.e., one time for each user request to record the program). In an aspect, the recording management system 124 may maintain the status (e.g., busy, available, etc.) of each of the recording agents 126a-c. To illustrate, when the recording management system 124 assigns one of the recording agents 126a-c, such as recording agent 126a, to write a segment to storage or perform some other task, the recording management system 124 may designate the recording agent 126a as busy. When the recording agent 126a completes the task, the recording agent 126a may be designated as available. As the recording management system 124 tracks the status of each of the recording agents 126a-c, the recording management system 124 may thus ascertain which of the recording agents 126a-c is available.

In another aspect, the recording management system 124 may not maintain the state of each of the recording agents 126a-c. Instead, each of the recording agents 126a-c may maintain each recording agents' 126a-c respective state. When one of the recording agents 126a-c, such as recording agent 126a, completes a task and transitions to an available state, the recording agent 126a may insert itself into a queue of available recording agents. If the recording management system 124 has a task to be performed, such as writing copies of a segment to the recording storage 128, the recording management system 124 may query the queue of available recording agents and assign the task to the recording agent at the top of the queue.

In yet another aspect, each of the recording agents 126a-c may maintain each recording agents' 126a-c respective state. When one of the recording agents 126a-c, such as the recording agent 126a, completes a task and is available, the recording agent 126a may indicate so to the recording management system 124 and/or request an additional task from the recording management system 124. The recording management system 124 may maintain a pool of pending tasks and assign a task from the pool to the recording agent 126a in response to a request from the recording agents 126a.

Based on a determination of an available recording agent, which may be accomplished by a query of a queue of available recording agents, a request from an available recording agent, or other method, the recording management system 124 may assign the determined recording agent to copy the determined segment to the recording storage 128 N times. As part of the assignment, the recording management system 124 may issue a command to the recording agent to make N copies of the segment. For example, the recording management system 124 may issue an HTTP POST command to the recording agent that includes a program identifier (e.g., a stream ID), a segment identifier (e.g., a start time, a stop time, and/or a duration of the segment), a segment file location (e.g., a URL or URI pointing to a file location on the linear storage 120 or other storage), and a number of times to copy the segment to the recording storage 128.

At step 210, the assigned recording agent, such as recording agent 126a, may access or receive the segment from the linear storage 120 a single time. The access or receipt may be based on information included in the command from the recording management system 124, such as the program identifier, the segment identifier, and/or the segment file location (e.g., the segment URI).

At step 212, the assigned recording agent, such as recording agent 126a, may create N copies of the segment in storage, such as the recording storage 128. This operation is based off the single access or receipt of the segment from the linear storage 120. The number of copies (i.e., N copies) may be specified in the command issued to the recording agent from the recording management system 124. As part of creating N copies of the segment in the recording storage 128, the recording agent 126a may issue an HTTP PUT command to the recording storage 128 that includes a file location of the segment and the number of copies (i.e., N copies) of the segment to be made in the recording storage 128. In an aspect, the N copies of the segment may be created in the recording storage 128 such that the N copies of the segment are written to a hard disk of the recording storage 128 in physical sequence.

The assigned recording agent, such as the recording agent 126a, may notify the recording management system 124 that the assigned recording agent has successfully completed creating N copies of the segment in storage and that the assigned recording agent is available. In an aspect, the recording management system 124 may return to step 206 and determine another segment of either the same program or another program and repeat steps 208 through 212 for that segment. It will be appreciated that multiple instances of steps 206 through 208 may occur simultaneously with different recording agents 126a-c. For example, the recording management system 124 may determine multiple different segments of a program and assign each of the different segments to a different recording agent (e.g., recording agent 126a, recording agent 126b, and recording agent 126c) to be copied to storage. Each of the recording agents 126a-c may then simultaneously and independently access or receive their respective segment and create N copies of the respective segment in storage. While the method 200 has been described with reference to a single program, it will also be appreciated that the method 200 is not so limited and may be performed with respect to multiple programs simultaneously being requested to be recorded and copies of each being made in storage.

An exemplary illustration of the method 200 shall now be provided. As an example, a popular television show may be scheduled to be shown on an upcoming Sunday night. One hundred users of a system, such as the system 100, may log into the system 100 and schedule for the television show to be recorded within the system 100 on the Sunday night. Come Sunday night, the system 100 may record a discrete copy of the television program for each of the one hundred requesting users. As the television show is received by a content source, the television show, or a portion thereof, may be broken into a number of segments, such as 30 2-second segments representing a 60-second rolling portion of the television show, and the segmentation may be documented in a separate file, such as a manifest file. A recording management system, such as the recording management system 124, within the system 100 may access the manifest file to determine a segment to copy to a recording storage, such as the recording storage 128. If no segments have yet to be copied to the recording storage 128, the recording management system 124 may select the first segment of the television show. In order to copy the first segment of the television show, the recording management system 124 may perform a query of its recording agents, such as recording agents 126a-c, to determine which recording agents are available and assign the copying task to an available recording agent. The assigned recording agent may create one hundred copies of the first segment (once for each requesting user) in the recording storage 128 by performing a single access of the first segment and commanding the recording storage 128 to write the first segment, in sequence upon the recording storage's 128 hard disk, one hundred times. The assigned recording agent may notify the recording management system 124 that it is available upon completion of the task. The recording management system 124 may continue to assign available recording agents to create one hundred copies of subsequent segments (e.g., the second segment, the third segment, etc.) in the recording storage 128 for each of the 30 segments of the portion of the television show. The process may be repeated for subsequent 60-second portions of the television show until the complete television show is recorded. If one of the one hundred users wishes to view the user's recorded instance of the television show, the copy of the segments (associated with the user) of the television show may be delivered from the recording storage 128 to the user's device, such as the device 132, for playback.

Figure 3:
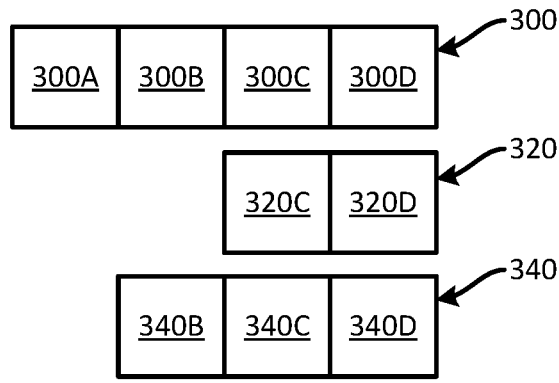
FIG. 3 illustrates a block diagram representation of program recordings in accordance with aspects of the disclosure.

FIG. 3 illustrates a representation of three recordings 300, 320, 340 of a program that are to be made based on three requests to record the program received by the system 100. Each of the three recordings 300, 320, 340 comprises one or more sequential segments, designated as A, B, C, and/or D (e.g., 300A, 300B, and so forth) and wherein 300B and 340B are identical segments, 300C, 320C, and 340C are identical segments, and so forth. The first recording 300 may have been based off of a scheduled request and includes all of the segments of the program. The second recording 320 and the third recording 340 may each have been based off of a real-time or impulse recording and each do not include one or more of the initial segments (e.g., the A segment).

Figure 4:
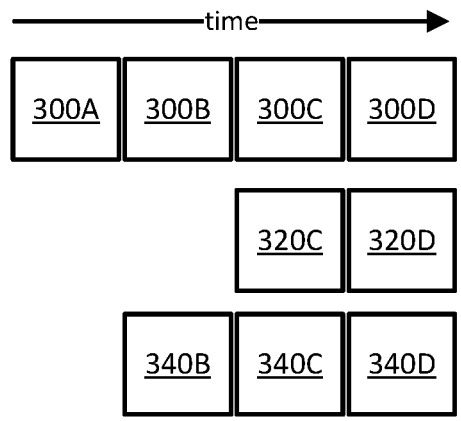
FIG. 4 illustrates a block diagram representation of program recordings in accordance with aspects of the disclosure.

FIG. 4 illustrates a method of creating the three recordings 300, 320, 340 of FIG. 3 in storage. In this method, each of the three recordings 300, 320, 340 are accessed from the linear storage 120 and written to the recording storage 128 independently. To illustrate, the B segment in the linear storage 120 for segment 300B is accessed, the recording storage 128 seeks an open location on one of its hard disks, and a copy is written to the open location on the hard disk of the recording storage 128. Independently, the B segment in the linear storage 120 for segment 340B is also accessed, the recording storage 128 seeks another location on one of its hard disks, and a copy is also written to the location on the hard disk of the recording storage 128. In this manner, the creation of segment 300B and segment 340B require two accesses of linear storage, two hard disk seek operations, and two hard disk write operations. Extrapolating this process to the other segments of the three recordings 300, 320, 340 will result in a total of nine accesses of linear storage 120, nine hard disk seek operations, and nine hard disk write operations.

Figure 5:
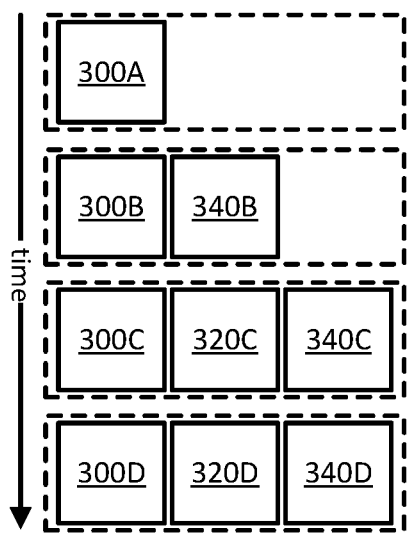
FIG. 5 illustrates a block diagram representation of program recordings in accordance with aspects of the disclosure.

FIG. 5 illustrates another method, such as the method 200 described with relation to FIG. 2, of creating the three recordings 300, 320, 340 of FIG. 3 in storage. In this method, common segments (e.g., 300B and 340B or 300C, 320C, and 340C, etc.) may be grouped together for accessing and writing to storage. To illustrate, the recording management system 124 may assign a recording agent, such as recording agent 126a, to write segment 300A to the recording storage 128. The recording agent 126a may access the A segment in the linear storage for segment 300A and may direct the recording storage 128 to create one copy of the A segment. The recording storage 128 may seek an open location on one of its hard disks for the one copy of the A segment, and a copy of the A segment may be written to the open location on the hard disk of the recording storage 128. This operation requires one linear storage access, one hard disk seek operation, and one hard disk write operation. Continuing the method, the recording management system 124 may assign a second recording agent, such as recording agent 126b, to write segments 300B and 340B to the recording storage 128. The recording agent 126b may accesse the B segment in the linear storage 120 a single time and may direct the recording storage 128 to create two sequential copies of the B segment. The recording storage 128 may seek an open location on one of its hard disks sufficient to accommodate the two copies of the B segment and then may perform a single write operation comprising the two copies of the B segment (one each for segments 300B and 340B). Despite creating two copies of the B segment, this operation requires one linear storage 120 access, one hard disk seek operation, and one hard disk write operation. Still continuing the method, the recording management system 124 may assign a third recording agent, such as recording agent 126c, to write segments 300C, 320C, and 340C to the recording storage 128. The recording agent 126c may access the C segment in the linear storage 120 a single time and instructs the recording storage 128 to create three sequential copies of the C segment. The recording storage 128 may seek an open location on one of its hard disks sufficient to fit the three copies of the C segment. The recording storage 128 may then perform a single write operation comprising the three copies of the C segment (one each for segments 300C, 320C, and 340C). Again, despite creating three copies of the C segment, this operation requires one linear storage 120 access, one hard disk seek operation, and one hard disk write operation. The method may be similarly performed for segments 300D, 320D, and 340D. In total, creating the three recordings 300, 320, and 340 requires four linear storage 120 accesses, four hard disk seek operations, and four hard disk write operations.

The method described in relation to FIG. 5, such as the method 200 of FIG. 2, stands in stark contrast to the method described in relation to FIG. 4. The method described in relation to FIG. 4 and the method described in relation to FIG. 5 both result in the three recordings 300, 320, 340 being created in the recording storage 128. The method described in relation to FIG. 4, however, performs the task with nine each of linear storage 120 accesses, hard disk seek operations, and hard disk write operations, while the method described in relation to FIG. 5 may perform the task with four each of linear storage 120 accesses, hard disk seek operations, and hard disk write operations. Thus the method described in relation to FIG. 5, such as the method 200 of FIG. 2, may result in a significant performance increase for a computer or series of computers upon which the recording management system 124 operates and/or for the recording storage 128.

Figure 6:
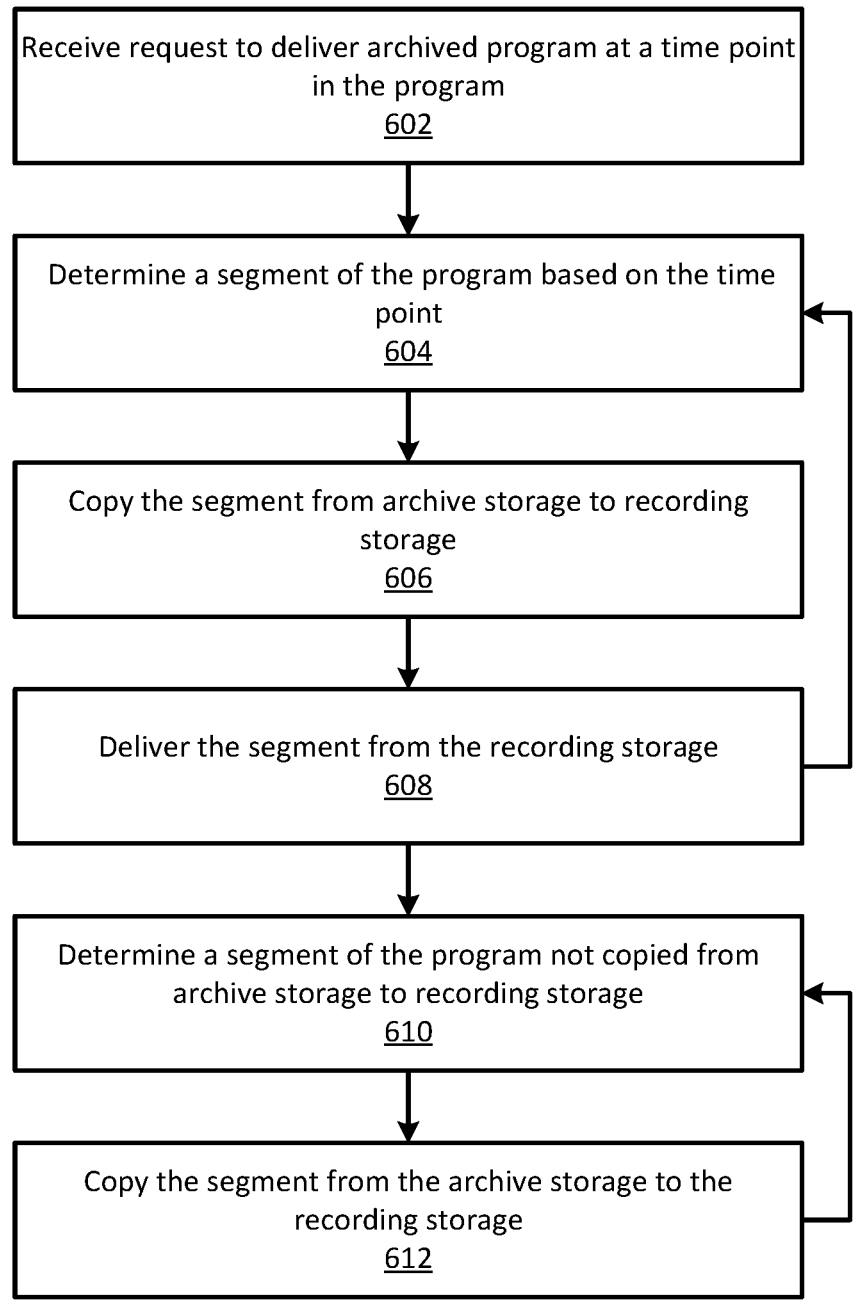
FIG. 6 illustrates a flow chart of an exemplary method in accordance with aspects of the disclosure.

FIG. 6 illustrates an example flow chart for a method 600 of delivering a recorded program, or portion thereof, to the device 132 after a requesting user's unique copy is moved from a storage from which the program may be delivered, such as the recording storage 128, to an archive storage, such as the archive storage 130. The copy of the program in the archive storage 130 is a consolidated (i.e., not unique) copy of one or more unique recordings that were present in the recording storage 128 but have since been removed after a certain period of time has passed since the recording was made and/or last accessed in the recording storage 128. In the event that a user requests to playback the archived program, a unique copy of the program is to be created, such as in the recording storage 128, for the requesting user. Even if the user does not playback the entire program, such as if the user begins playback of the program in the middle of the program, the user skips ahead in the program (e.g., skips a commercial), or the user ends the playback prematurely, the unique copy of the entirety of the program is still to be created. In the method 600, the segmented nature of a program within the system 100 may be leveraged to facilitate delivery and playback of the program while the unique copy of the program is created.

At step 602, a request to deliver an archived program at a specified time point (e.g., a temporal location) in the program may be received by, for example, the origin server 134. The request may be made by a user and be received from the device 132 of the user. The specified time point may indicate the start time of the program or it may indicate a time point within the middle of the program (e.g., the 10:30 mark in a 30:00 minute program), as examples. The request to deliver an archived program may reflect the user initiating the playback of the program (whether from the beginning or the middle of the program) or may reflect the user skipping ahead or backwards within the program. The request may further include, for example, identifications of the user (e.g., an account identifier, a username, and/or a password), the device 132, and/or the program. Upon receiving the request, the origin server 134 may communicate the request to the recording management system 124.

At step 604 and based, at least, on the time point specified in the request, a segment of the program may be determined by, for example, the recording management system 124. The determined segment may be intended to be associated with the requesting user. In an aspect, the association with the requesting user may be exclusive with respect to other users. In order to determine an appropriate segment, the recording management system 124 may reference a manifest file associated with the program. For example, the specified time point may be cross referenced with a listing in the manifest file of the segments of the program and each of their associated time intervals to determine which of the segments corresponds to the specified time point. If one or more segments have already been determined, copied from the archive storage 130, and delivered, the segment may be determined with consideration to those previous iterations. For example, if the initial segment corresponding to the specified time point and the subsequent two segments have already been copied from the archive storage 130 and delivered, the third segment after the initial segment may be determined.

At step 606, the determined segment may be copied from an archive storage, such as the archive storage 130, to a storage appropriate for delivery of the segment and/or for maintaining the complete unique copy of the program, such as the recording storage 128. The copy of the segment in the recording storage 128 may be associated with the requesting user. In an aspect, the association may be exclusive with respect to other users. The copying from the archive storage 130 to the recording storage 128 may be performed by or otherwise facilitated by the recording management system 124. The newly-copied segment may be combined or otherwise associated (such as a logical linking of linearly contiguous segments making up the program or a portion thereof) with other segments of the program in the recording storage 128. For example, if prior segments of the program have already been copied to the recording storage 128, the newly-copied segment may be combined or otherwise associated with those prior segments.

At step 608, the segment may be delivered from the recording storage 128 to the device 132 for playback. The delivery may be direct (e.g., the device 132 downloads directly from the recording storage 128) or indirect. As an example of an indirect delivery, the recording management system 124 may provide the segment to the origin server 134, from which the segment is then delivered to the device 132.

After the segment of the program is delivered to the device 132 from the recording storage 128, steps 604 through 608 may be repeated for subsequent segments of the program necessary to effectuate the requested playback of the program. For example, if a user requested that a program commence playback at the 10:00 (i.e., ten minute, zero second) time point and the segments of the program are two seconds each in length, the initial steps 604 through 608 may include determining a first segment for 10:00 to 10:02, copying the first segment from the archive storage 130 to the recording storage 128, and delivering the first segment to the device 132. A second iteration of steps 604 through 608 may include determining a second segment for 10:02 to 10:04, copying the second segment from the archive storage 130 to the recording storage 128, and delivering the second segment to the device 132. The iterative process may be repeated until the user stops playback of the program or the final segment of the program is delivered.

At step 610, a segment may be determined, by, for example, the recording management system 124, that has not yet been copied from the archive storage, such as the archive storage 130, to the storage that will maintain the unique copy of the program for the requesting user, such as the recording storage 128. The determined segment may be intended to be associated, exclusively, in some aspects, with the requesting user. In an aspect, the determination may occur upon the completion of one or more iterations of steps 604 through 608. As an example, if the user requested playback (and therefore delivery) of a program at a midpoint of the program, the segments from the mid-point of the program to the end of the program may have been copied from the archive storage 130 to the recording storage 128 in one or more iterations of steps 604 through 608. Therefore in this case, the recording management system 124 may determine a segment from before the specified mid-point of the program.

At step 612, the determined segment of step 610 may be copied from the archive storage 130 to the recording storage 128. The copy of the segment in the recording storage 128 may be associated with the requesting user. In some aspects, the association may be exclusive with respect to other users of the system 100. The copying from the archive storage 130 to the recording storage 128 may be performed by or otherwise facilitated by the recording management system 124. The segment may be combined or otherwise associated (such as a logical linking of linearly contiguous segments making up the program or a portion thereof) with other segments of the program in the recording storage 128. For example, the segment copied in step 612 may be combined or otherwise associated with one or more segments copied in step 606 or with one or more segments copied in prior iterations of step 612.

Steps 610 through 612 may be repeated for other segments that had not yet been copied from the archive storage 130 to the recording storage 128, such as those copied in one or more iterations of steps 604 through 608 and/or prior iterations of steps 610 through 612. Continuing the example of the user requesting playback from the mid-point of the program and the segments from the mid-point to the end of the program already being copied to the recording storage 128, steps 610 through 612 may be repeated multiple times until each of the segments prior to the mid-point are copied from the archive storage 130 to the recording storage 128. In this manner, all of the segments comprising the program, and thus the entirety of the program itself, may be copied to the recording storage 128.

An exemplary illustration of the method 600 shall now be provided. As an example, a system, such as the system 100, user may have recorded a television show several months prior and has not viewed it in the interim. The user's copy of the television show that was initially made in a recording storage, such as the recording storage 128, may have been removed from the recording storage 128 and there may exist only a copy in an archive storage, such as the archive storage 130, that is not uniquely associated with the user. If the user requests playback of the television program, the entirety of the unique copy of the television show must eventually be recreated in the recording storage 128, even if the user does not request the entirety of the television show for playback. For instance, the user may request that the system 100 deliver the recorded television show for playback at a midway point in the program (the user had watched the beginning of the television show when it was originally shown). A recording management system, such as the recording management system 124, of the system 100 may determine the segment of the television program corresponding to the midway time point and copy that segment from the archive storage 130 to the recording storage 128. The copy of the segment in the recording storage 128 may be delivered to the user's device, such as the device 132, for playback. The recording management system 124 may determine, copy to the recording storage 128, and deliver subsequent segments of the television program until the end of the television program is reached. Independent of the determining, copying, and delivery of the segments comprising the television show from the midway point and on, the segments of the television show prior to the midway point (which do not need to be delivered to the user's device) may also be copied to the recording storage 128. The recording management system 124 may determine the first segment of the television and create a copy of that segment from the archive storage 130 to the recording storage 128. The recording management system 124 may repeat this for subsequent segments until the midway point of the television show is reached. In this manner, the whole copy of the television show may be recreated in the recording storage 128, even though the user was able to begin playback of the television show at the midway point before the whole copy was made.

Figure 7:
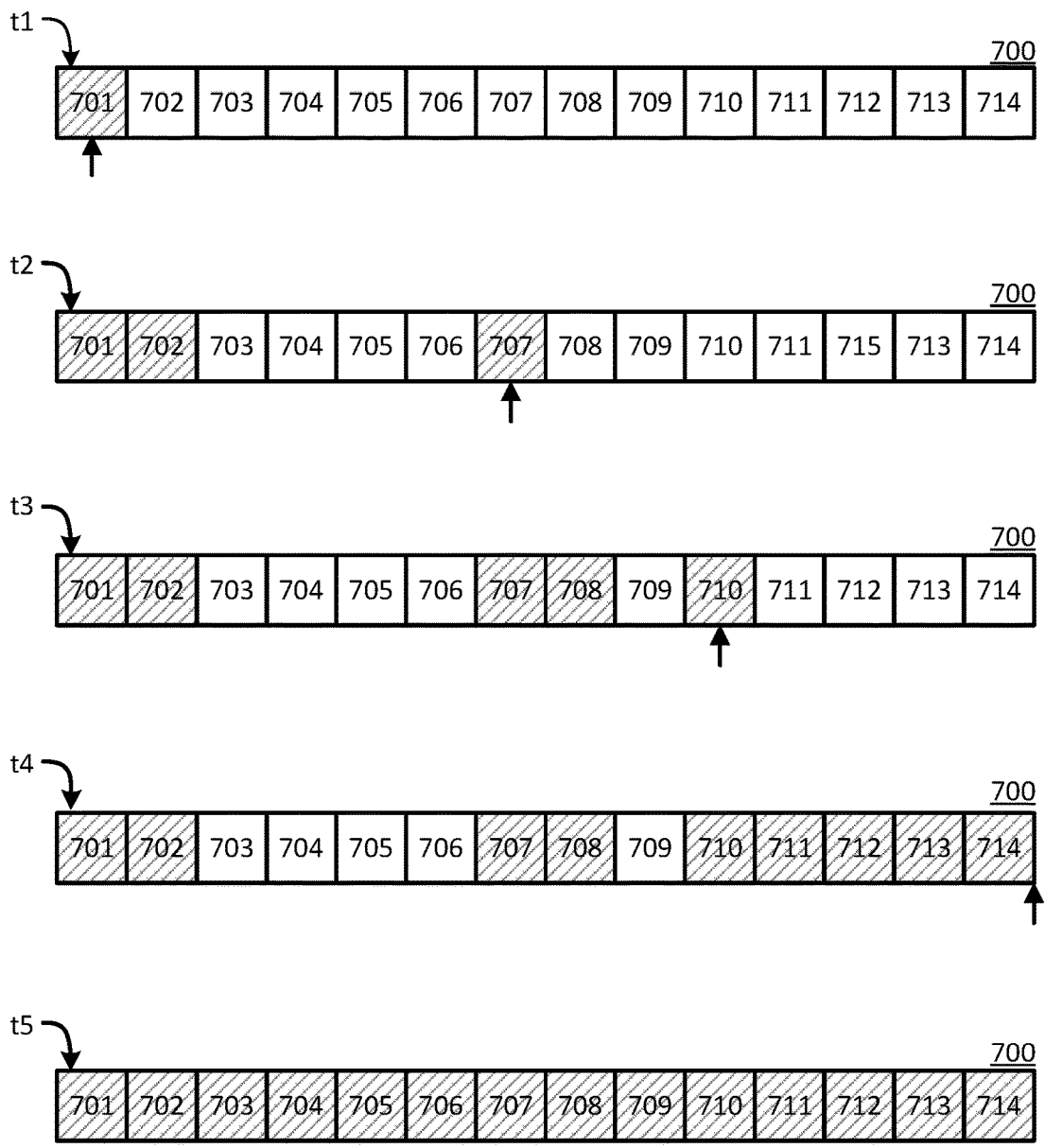
FIG. 7 illustrates a block diagram representation of program recordings in accordance with aspects of the disclosure.

FIG. 7 depicts an illustration of the operations described in method 600 for fulfilling a request to deliver an archived program starting at a specified time point and copying the program from the archive storage 130 to the recording storage 128. Representations of a program 700 and its segments 701-714 are depicted at succeeding times t1-t5. In the illustration of FIG. 7, segments that are not yet copied from the archive storage 130 to the recording storage 128 are blank and segments that have been copied from the archive storage 130 to the recording storage 128 are patterned.

At time t1, a user may decide to begin playback of the archived program 700 from the beginning and, therefore, a request may be received to deliver the program 700 with a specified time point for the beginning of the program 700. Segment 701 may be determined to correspond to the beginning of the program 700. Segment 701 may be copied from the archive storage 130 to the recording storage 128 and segment 701 may be delivered to the user's device 132 for playback. The copying of segment 701 to storage is representing by the patterned state of segment 701.

At time t2, the user may have continued watching the program 700 and segment 702 may have been delivered to the user's device 132 and copied to the recording storage 128, as reflected in the patterned state of segment 702. After viewing segment 702, the user may decide to skip ahead to a mid-point in the program 700 corresponding to segment 707. Segment 707 may be copied to the recording storage 128, as reflected in the patterned state of segment 707, and subsequently delivered to the user's device 132 for playback.

At time t3, the user may have continued watching the program 700 from the mid-point of the program 700. Thus, segment 708 may have been copied to the recording storage 128, reflected in the patterned state of segment 708, and delivered to the user's device 132 for playback. After viewing segment 708, the user may skip ahead, such as, for example, to skip a commercial, to a later point in time of the program 700 corresponding to segment 710. Segment 710 may then be copied to the recording storage 128, as reflected in the patterned state of segment 710, and delivered to the user's device 132 for playback.

At time t4, the user may have watched the program until its conclusion and, thus, the remaining segments, segments 711-714 may have been copied to the recording storage 128, reflected in the patterned state of segments 711-714, and delivered to the user's device 132 for playback. At this time, the user's request to receive and playback the program 700 may have been fulfilled, but a complete unique copy of the program 700 may not yet be created because segments 703-706 and 709 may have not yet been copied to the recording storage 128.

At time t5, segments 703-706 and 709 may be determined as not having yet been copied to the recording storage 128 and, therefore, may then be copied from the archive storage 130 to the recording storage 128, as reflected in the patterned state of segments 703-706 and 709. As can be seen at time t5, all segments may now have been copied to the recording storage 128, thus forming a complete unique copy of the program 700.

Figure 8:
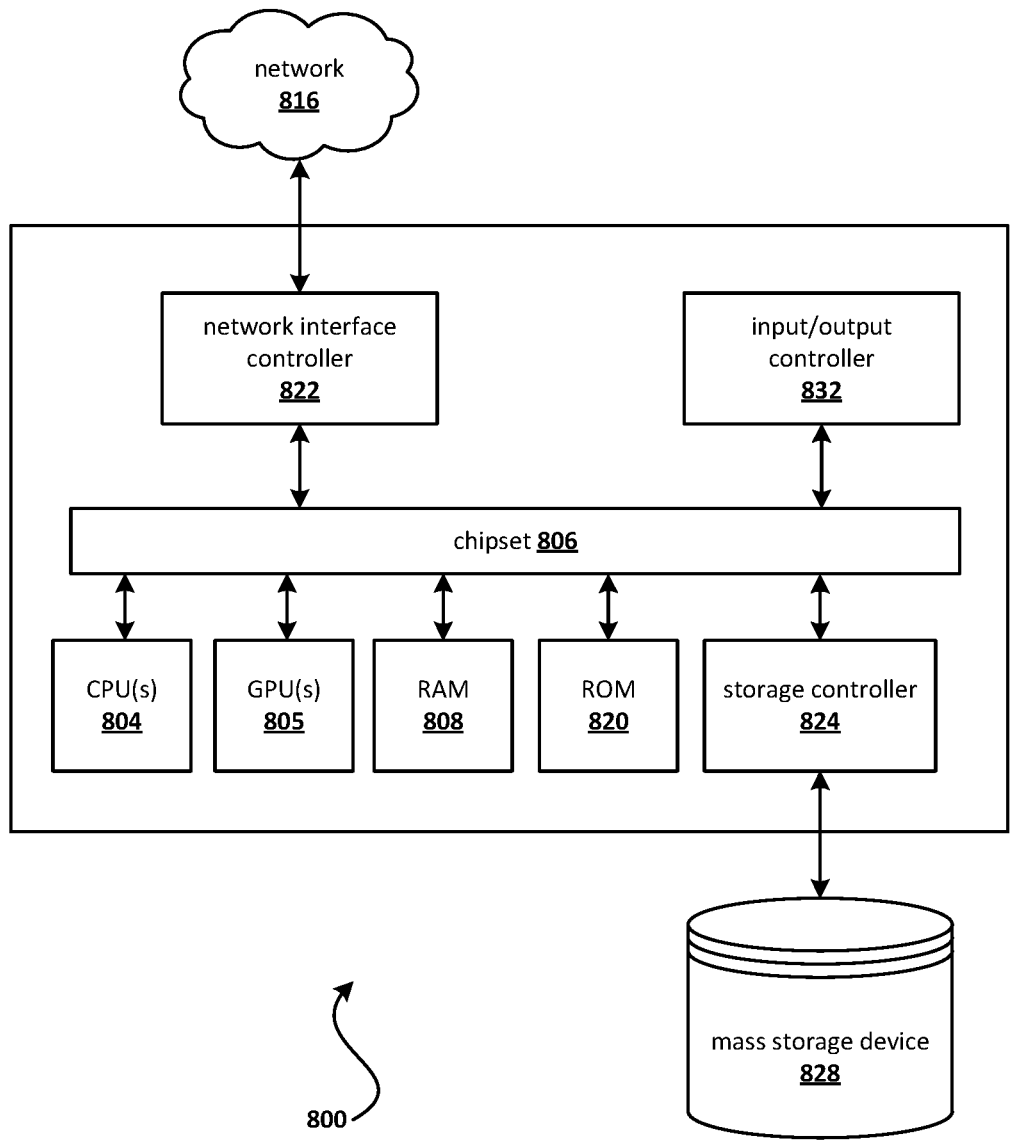
FIG. 8 illustrates a block diagram of an exemplary computing device.

FIG. 8 depicts a computing device that may be used in various aspects, such as the servers, modules, and/or devices depicted in FIG. 1. With regard to the example architecture of FIG. 1, the transcoder 114, the linear module 116, the linear packager 118, the linear storage 120, the recording management system 124, the recording agents 126a-c, the recording storage 128, the archive storage 130, the origin server 134, and/or the device 132 may each be implemented in an instance of a computing device 800 of FIG. 8. The computer architecture shown in FIG. 8 illustrates a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2 and 6.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may, in various embodiments, be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

A mass storage device, such as the mass storage device 828 depicted in FIG. 8, may store an operating system utilized to control the operation of the computing device 800. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described in relation to FIGS. 2 and 6.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that can be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that can be performed it is understood that each of these additional operations can be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically described, or multiple blocks or states may be combined in a single block or state. The example blocks or states may be performed in serial, in parallel, or in some other manner Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   determining a quantity of a plurality of requests to store a content asset, wherein the content asset comprises a plurality of segments and wherein each request of the plurality of requests is associated with a user of a plurality of users;
   accessing, from a first storage location storing the plurality of segments of the content asset, a copy of a segment of the plurality of segments; and
   causing, based on the copy of the segment from the first storage location, a plurality of copies of the segment to be stored at a second storage location, wherein a quantity of the plurality of copies of the segment is the quantity of the plurality of requests to store the content asset and wherein each copy of the plurality of copies of the segment is associated with a user of the plurality of users.

2. The method of claim 1, wherein the causing the plurality of copies of the segment to be stored at the second storage location comprises causing at least a portion of the plurality of copies of the segment to be written, in sequence, to a hard disk associated with the second storage location.

3. The method of claim 1, further comprising:
   determining a recording agent of a plurality of recording agents,
   wherein the accessing the copy of the segment from the first storage location comprises accessing, by the determined recording agent, the copy of the segment from the first storage location, and
   wherein the causing the plurality of copies of the segment to be stored at the second storage location comprises causing the plurality of copies of the segments to be stored, by the determined recording agent, at the second storage location.

4. The method of claim 1, wherein the causing the plurality of copies of the segment to be stored at the second storage location is further based on an access of the copy of the segment from the first storage location.

5. The method of claim 1, further comprising:
   determining an instruction to cause the plurality of copies of the segment to be stored at the second storage location, wherein the instruction indicates a file location of the copy of the segment at the first storage location and the quantity of the plurality of requests to store the content asset.

6. The method of claim 5, wherein the instruction comprises an HTTP command.

7. The method of claim 1, wherein the second storage location comprises a recording storage from which a copy of the plurality of copies of the segment is deliverable to a device associated with the user associated with the copy.

8. The method of claim 1, further comprising:
receiving an information file associated with the content asset, wherein the information file indicates the plurality of segments of the content asset and a file location of each segment of the plurality of segments at the first storage location,
wherein the accessing the copy of the segment from the first storage location is based on the information file.

9. A method comprising:
determining a quantity of a plurality of requests to store a content asset, wherein the content asset comprises a plurality of segments and wherein each request of the plurality of requests is associated with a user of a plurality of users; and
causing, based on an access of a segment of the plurality of segments from a first storage, a plurality of copies of the segment to be stored in a second storage, wherein a quantity of the plurality of copies of the segment is the quantity of the plurality of requests to store the content asset and wherein each copy of the plurality of copies of the segment is associated with a user of the plurality of users.

10. The method of claim 9, further comprising:
determining a location in the first storage of the segment, wherein the causing the plurality of copies of the segment to be stored in the second storage is further based on the access of the segment at the determined location in the first storage.

11. The method of claim 9, wherein the causing the plurality of copies of the segment to be stored in the second storage comprises causing at least a portion of the plurality of copies of the segment to be written, in sequence, to a hard disk associated with the second storage.

12. The method of claim 9, further comprising:
determining a recording agent of a plurality of recording agents,
wherein the access of the segment from the first storage is by the determined recording agent, and
wherein the causing the plurality of copies of the segment to be stored in the second storage comprising causing the plurality of copies of the segment to be stored, by the determined recording agent, in the second storage.

13. The method of claim 9, further comprising:
determining an instruction to cause the plurality of copies of the segment to be stored in the second storage, wherein the instruction indicates a file location of the segment in the first storage and the quantity of the plurality of requests to store the content asset.

14. The method of claim 9, wherein the second storage comprises a recording storage from which a copy of the plurality of copies of the segment is deliverable to a device associated with the user associated with the copy.

15. A system comprising:
a first storage;
a second storage; and
a computing device configured to:
determine a quantity of a plurality of requests to store a content asset, wherein the content asset comprises a plurality of segments and wherein each request of the plurality of requests is associated with a user of a plurality of users;
access, from the first storage, a copy of a segment of the plurality of segments; and
cause, based on the copy of the segment from the first storage, a plurality of copies of the segment to be stored in the second storage, wherein a quantity of the plurality of copies of the segment is the quantity of the plurality of requests to store the content asset and wherein each copy of the plurality of copies of the segment is associated with a user of the plurality of users.

16. The system of claim 15, wherein the computing device is further configured to:
cause at least a portion of the plurality of copies of the segment to be written, in sequence, to a hard disk associated with the second storage.

17. The system of claim 15, wherein the computing device is further configured to:
determine a recording agent of a plurality of recording agents;
access, from the first storage and by the determined recording agent, the copy of the segment; and
cause, based on the copy of the segment from the first storage and by the determined recording agent, the plurality of copies of the segment to be stored in the second storage.

18. The system of claim 15, wherein the computing device is further configured to:
cause, based on an access of the copy of the segment from the first storage, the plurality of copies of the segment to be stored in the second storage.

19. The system of claim 15, wherein the computing device is further configured to:
determine an instruction to cause the plurality of copies of the segment to be stored in the second storage, wherein the instruction indicates a file location of the copy of the segment in the first storage and the quantity of the plurality of requests to store the content asset.

20. The system of claim 15, wherein the second storage comprises a recording storage from which a copy of the plurality of copies of the segment is deliverable to a device associated with the user associated with the copy.

* * * * *